US012051537B2

(12) United States Patent
Drofenik et al.

(10) Patent No.: US 12,051,537 B2
(45) Date of Patent: Jul. 30, 2024

(54) MEDIUM FREQUENCY TRANSFORMER

(71) Applicant: Hitachi Energy Ltd, Zürich (CH)

(72) Inventors: Uwe Drofenik, Zürich (CH); Thomas Gradinger, Aarau Rohr (CH); Bernhard Wunsch, Baden-Dättwil (CH)

(73) Assignee: Hitachi Energy Ltd, Zürich (CH)

( * ) Notice: Subject to any disclaimer, the term of this patent is extended or adjusted under 35 U.S.C. 154(b) by 653 days.

(21) Appl. No.: 17/278,914

(22) PCT Filed: Sep. 18, 2019

(86) PCT No.: PCT/EP2019/075231
§ 371 (c)(1),
(2) Date: Mar. 23, 2021

(87) PCT Pub. No.: WO2020/064514
PCT Pub. Date: Apr. 2, 2020

(65) Prior Publication Data

US 2021/0398741 A1 Dec. 23, 2021

(30) Foreign Application Priority Data

Sep. 25, 2018 (EP) .................................... 18196561

(51) Int. Cl.
*H01F 27/06* (2006.01)
*H01F 27/32* (2006.01)

(52) U.S. Cl.
CPC ........... *H01F 27/327* (2013.01); *H01F 27/06* (2013.01); *H01F 2027/328* (2013.01)

(58) Field of Classification Search
CPC ................... H01F 27/327; H01F 27/06; H01F 2027/328; H01F 27/2823; H01F 27/29
See application file for complete search history.

(56) References Cited

U.S. PATENT DOCUMENTS 4,459,575 A 7/1984 Geissler et al.
7,990,246 B2 * 8/2011 Lindholm ........... H01F 27/2847 29/605

(Continued)

FOREIGN PATENT DOCUMENTS

CN 103050234 A 4/2013
CN 103069515 A 4/2013

(Continued)

OTHER PUBLICATIONS

First Office Action and Search Report, Chinese Patent Application No. 2019800558752, mailed Aug. 2, 2023, 6 pages.

(Continued)

*Primary Examiner* — Tuyen T Nguyen
(74) *Attorney, Agent, or Firm* — Sage Patent Group

(57) ABSTRACT

A transformer includes a transformer core having a first core leg having a first longitudinal axis and second core leg having a second longitudinal axis; a first low voltage (LV) winding arranged around the first core leg, a first high voltage (HV) winding arranged around the first LV winding; a second low voltage (LV) winding arranged around the second core leg; and a second high voltage winding arranged around the second LV winding, wherein the first HV winding is provided with a first HV connector and a second HV connector each extending substantially perpendicular away from the first longitudinal axis, and wherein the second HV winding is provided with a third HV connector and a fourth HV connector each extending substantially perpendicular away from the second longitudinal axis.

13 Claims, 2 Drawing Sheets

(56) References Cited

U.S. PATENT DOCUMENTS

| | | | |
|---|---|---|---|
| 2011/0248808 A1 | 10/2011 | Singh et al. | |
| 2014/0159846 A1 | 6/2014 | Krämer et al. | |
| 2017/0104426 A1 | 4/2017 | Mills | |

FOREIGN PATENT DOCUMENTS

| | | | | |
|---|---|---|---|---|
| CN | 202930167 U | 5/2013 | | |
| CN | 104637655 A | 5/2015 | | |
| DE | 2826266 A1 | 12/1979 | | |
| EP | 2075806 A1 * | 7/2009 | ......... | H01F 27/2885 |
| EP | 2075806 A1 | 7/2009 | | |
| EP | 2696358 A1 | 2/2014 | | |
| EP | 2833378 A1 | 2/2015 | | |
| EP | 3176796 A1 | 6/2017 | | |
| JP | H02-162708 A | 6/1990 | | |
| JP | H06-181135 A | 6/1994 | | |
| JP | 2018-101749 A | 6/2018 | | |
| JP | 6278153 B1 | 6/2019 | | |
| WO | 2018007514 A1 | 1/2018 | | |

OTHER PUBLICATIONS

Notice of Reasons for Refusal, Japanese Patent Application No. 2021-516631, mailed Jun. 7, 2023, 4 pages.

International Search Report and Written Opinion of the International Searching Authority, PCT/EP2019/075231, mailed Nov. 12, 2019, 17 pages.

Extended European Search Report, European Patent Application No. 18196561.7, mailed Feb. 28, 2019, 8 pages.

Huang, P., et al., “Electric Field Simulations and Analysis for High Voltage High Power Medium Frequency Transformer,” Energies 2017, 10, 371, Mar. 16, 2017, 11 pages.

* cited by examiner

MEDIUM FREQUENCY TRANSFORMER

CROSS REFERENCE TO RELATED APPLICATIONS

This application is a 35 U.S.C. § 371 national stage application of PCT International Application No. PCT/EP2019/075231 filed on Sep. 19, 2019, which in turns claims foreign priority to European Patent Application No. 18196561.7, filed on Sep. 25, 2018, the disclosures and content of which are incorporated by reference herein in their entirety.

TECHNICAL FIELD

Embodiments of the present disclosure relate to transformers, particularly medium-frequency transformers (MFTs), more particularly dry-cast MFTs.

BACKGROUND

Medium-frequency transformers (MFTs) are key components in various power-electronic systems. Examples in rail vehicles are auxiliary converters and solid-state transformers (SSTs) replacing the bulky low-frequency traction transformers. Further applications of SSTs are being considered, for example for grid integration of renewable energy sources, EV charging infrastructure, data centers, or power grids on board of ships. It is expected that SSTs will play an increasingly important role in the future.

The electric insulation constitutes a significant challenge in MFTs, because, on the one hand, operating voltages can be high (in the range of 10 kV to 100 kV, particularly 50 kV to 100 kV) and on the other hand, the power of an individual MFT is rather low (in the range of several hundred kVA) compared to conventional low-frequency distribution and power transformers.

For the mentioned power and voltage range of MFTs, the main challenges for designing a compact and simple low-cost medium-frequency transformer (MFT) are efficient cooling, reducing winding losses due to proximity effect, and location of the bushings of the high-voltage winding.

Accordingly, there is a continuing demand for transformers, particularly dry-cast medium-frequency transformers which overcome at least some of the problems of the state of the art or with which negative effects of conventional transformers can at least be reduced.

SUMMARY

In light of the above, a transformer according to the independent claim is provided. Further aspects, advantages, and features are apparent from the dependent claims, the description, and the accompanying drawings.

In particular, according to the present disclosure, a transformer is provided, the transformer includes a transformer core having a first core leg having a first longitudinal axis and second core leg having a second longitudinal axis. Additionally, the transformer includes a first low voltage (LV) winding arranged around the first core leg. The first LV winding extends along a first length L1 in the direction of the first longitudinal axis. Further, the transformer includes a first high voltage (HV) winding arranged around the first LV winding. The first HV winding extends along a second length L2 in the direction of the first longitudinal axis. The second length L2 is shorter than the first length L1. Moreover, the transformer includes a second LV winding arranged around the second core leg. The second LV winding extends along a third length L3 in the direction of the second longitudinal axis. Additionally, the transformer includes a second HV winding arranged around the second LV winding. The second HV winding extends along a fourth length L4 in the direction of the second longitudinal axis. The fourth length L4 is shorter than the third length L3. Further, the first HV winding is provided with a first HV connector and a second HV connector each extending substantially perpendicular away from the first longitudinal axis. The second HV winding is provided with a third HV connector and a fourth HV connector each extending substantially perpendicular away from the second longitudinal axis.

Accordingly, beneficially the transformer of the present disclosure is improved with respect to the prior art, particularly with respect to compactness, reduction of winding losses due to proximity effect, simplicity of transformer design, robustness, location of connectors of the high voltage winding and costs. For better understanding, with respect to the "proximity effect" the following is to be noted. In a conductor carrying alternating current, if currents are flowing through one or more other nearby conductors, such as within a closely wound coil of wire, the distribution of current within the first conductor will be constrained to smaller regions. The resulting current crowding is termed the proximity effect. This crowding gives an increase in the effective resistance of the circuit, which increases with frequency.

More specifically, the transformer as described herein addresses the following main challenges of designing a compact and simple low-cost transformer, particularly medium frequency transformer.

The first challenge is to provide efficient cooling of the windings, which typically have to be cast due to insulation requirements and for mechanical stability.

The second challenge is the difficulty of interleaving of the windings for which typically large distances are needed due to insulation requirements. In this regard, it is to be noted that non-interleaving windings typically result in increased high-frequency winding losses.

The third challenge is the location of the bushings, i.e. the connectors, of the high-voltage winding. Typically, a large distance to the grounded core and to the edges of that core and the low-voltage winding are required.

The first point is highly relevant for building robust and reliable transformers, particularly dry-type MFTs in the range of several 100 kW.

The second point is especially important for MFTs (as compared to 50 Hz distribution transformers) because winding losses due to the proximity effect increase significantly with the operating frequency. In the future, this issue will become more and more important due to the introduction of fast switching wide-bandgap semiconductors.

The third point concerning the bushings is increasingly difficult to fulfill, if the MFT has to be highly compact, which is typically the goal of MFT design, because then the bushings will start to dominate the transformer design.

BRIEF DESCRIPTION OF THE DRAWINGS

So that the manner in which the above recited features of the present disclosure can be understood in detail, a more particular description of the disclosure, briefly summarized above, may be is given by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
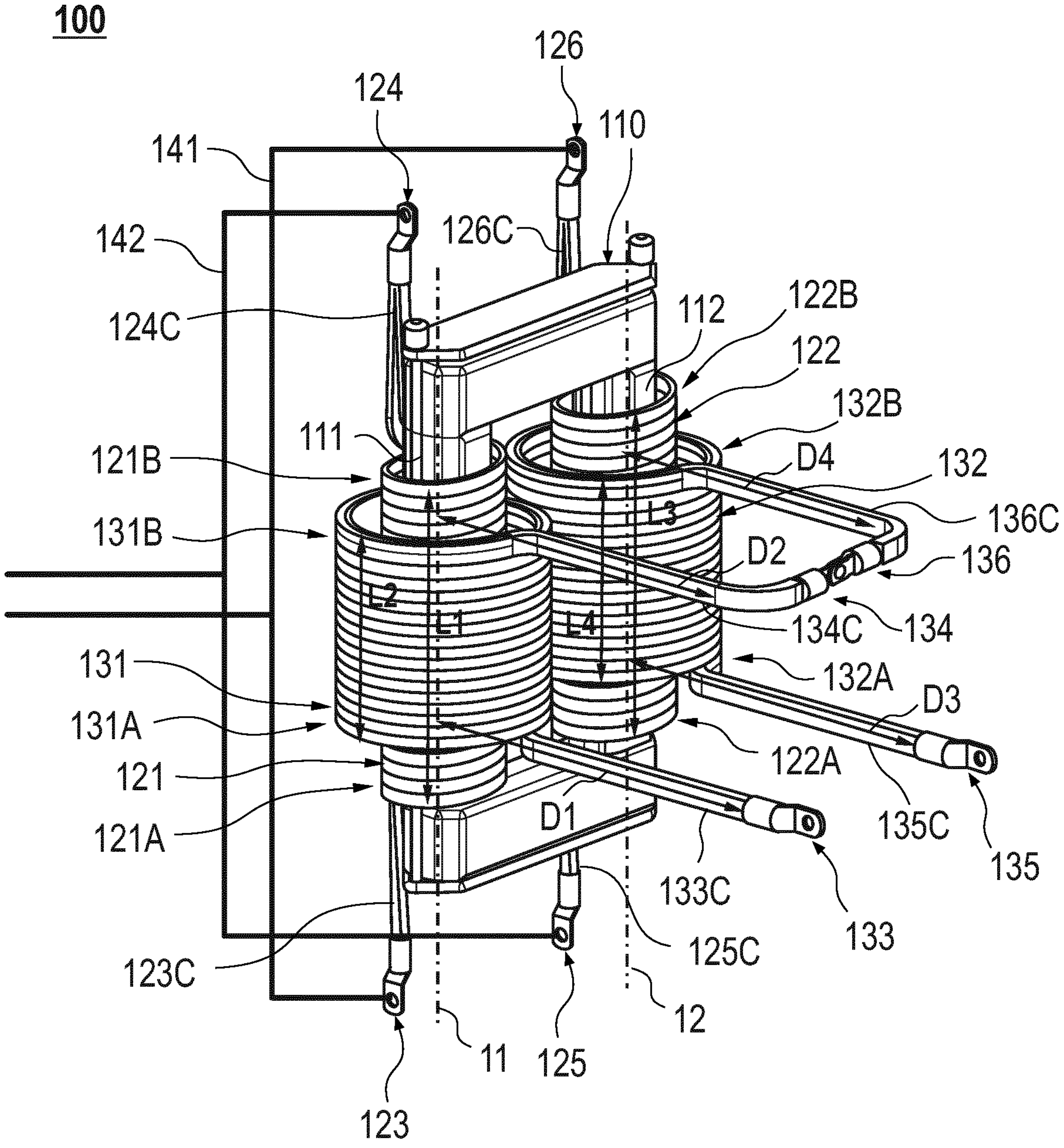
FIG. 1 shows a schematic view of a transformer according to embodiments described herein.

With exemplary reference to FIG. 1, a transformer 100 according to the present disclosure is described. According to embodiments, which can be combined with other embodiments described herein, the transformer 100 includes a transformer core 110 having a first core leg 111 having a first longitudinal axis 11 and second core leg 112 having a second longitudinal axis 12. In particular, typically the second longitudinal axis 12 is substantially parallel to the first longitudinal axis 11. In the present disclosure, the term "substantially parallel" can be understood as being parallel within a deviation angle D from exact parallelism of D≤±10°, particularly D≤±5°, more particularly D≤±2°.

Additionally, as exemplarily show in FIG. 1, the transformer 100 includes a first low voltage (LV) winding 121 arranged around the first core leg 111. The first LV winding 121 extends along a first length L1 in the direction of the first longitudinal axis 11. Further, the transformer 100 includes a first high voltage (HV) winding 131 arranged around the first LV winding 121. The first HV winding 131 extends along a second length L2 in the direction of the first longitudinal axis 11. The second length L2 is shorter than the first length L1. In particular, as exemplarily shown in FIG. 1, both ends of the first LV winding 121 extend over the ends of the first HV winding 131.

Moreover, the transformer 100 includes a second. LV winding 122 arranged around the second core leg 112, as exemplarily shown in FIG. 1. The second LV winding 122 extends along a third length L3 in the direction of the second longitudinal axis 12. Additionally, the transformer 100 includes a second HV winding 132 arranged around the second LV winding 122. The second HV winding 132 extends along a fourth length L4 in the direction of the second longitudinal axis 12. The fourth length L4 is shorter than the third length L3. In particular, as exemplarily shown in FIG. 1, both ends of the second LV winding 122 extend over the ends of the second HV winding 132.

Further, as exemplarily shown in FIG. 1, the first HV winding 131 is provided with a first HV connector 133 and a second HV connector 134. Each of the first HV connector 133 and the second HV connector 134 extend substantially perpendicular away from the first longitudinal axis 11. The second HV winding 132 is provided with a third HV connector 135 and a fourth HV connector 136. Each of the third HV connector 135 and the fourth HV connector 136 extend substantially perpendicular away from the second longitudinal axis 12.

In the present disclosure, the term "substantially perpendicular" can be understood as being perpendicular within a deviation angle D from the exact perpendicularity of D≤±10°, particularly D≤±5°, more particularly D≤±2°.

In particular, the transformer 100 as described herein can be a medium frequency transformer. In particular, the transformer 100 can be a dry-cast medium frequency transformer.

Accordingly, beneficially the transformer of the present disclosure is improved with respect to the prior art, particularly with respect to compactness, reduction of winding losses due to proximity effect, simplicity of transformer design, robustness, location of connectors of the high voltage winding and costs.

It is to be noted that state-of-the-art core- and shell-type transformers do not provide interleaving of HV and LV windings, resulting in potentially high losses due to proximity effect. Therefore, for the HV winding of core- and shell-type transformers one goal is to provide minimum insulation distances against the grounded core and the LV winding. Some non-interleaving state-of-the-art winding schemes allow efficient cooling of the windings, e.g. by convective cooling between LV and HV winding, as well as relatively simple connections (bushing) to the HV winding.

It has been found that by splitting and rearranging of the windings (also referred to as interleaved windings), the stray field in the windings window can be reduced and the high-frequency losses in the windings due to proximity effect can be reduced significantly. However, if interleaving is applied, cooling of the HV winding becomes very difficult, and it becomes very difficult to attach connectors (bushing) to the HV winding, because the connector (bushing) would be very close to LV winding and/or core, and associated geometric edges.

With exemplary reference to FIG. 1, according to some embodiments, which can be combined with other embodiments described herein, the second HV connector 134 of the first HV winding 131 is connected with the fourth HV connector 136 of the second HV winding 132. Accordingly, the second HV connector 134 and the fourth HV connector 136 are electrically connected to provide for a series connection of the first HV winding 131 and the second HV winding 132. Typically, the first HV connector 133 of the first HV winding 131 and the third HV connector 135 of the second HV winding 132 provide the HV connections of the transformer. For instance, the first HV connector 133 can be a $HV_{in}$ connector and the third HV connector 135 can be a $HV_{out}$ connector.

As exemplarily shown in FIG. 1, according to some embodiments, which can be combined with other embodiments described herein, the first HV connector 133 is provided at a first end 131A of the first HV winding 131 and the second HV connector 134 is provided at a second end 131B of the first HV winding 131. The second end 131B of the first HV winding 131 is opposite the first end 131A of the first HV winding 131.

Further, as exemplarily shown in FIG. 1, typically the third HV connector 135 is provided at a first end 132A of the second HV winding 132 and the fourth HV connector 136 is provided at a second end 132B of the second HV winding 132. The second end 132B of the second HV winding 132 is provided opposite the first end 132A of the second HV winding 132.

According to some embodiments, which can be combined with other embodiments described herein, the first HV connector 133 includes a first HV connection portion 133C, as exemplarily show in FIG. 1. Typically, the first HV connection portion 133C extends over a first distance D1 of D1≥0.3×L2, particularly D1≥0.5×L2, substantially perpendicular away from the first longitudinal axis 11. Typically, the second HV connector 134 includes a second HV connection portion 134C. Typically, second HV connection portion 134C extends over a second distance D2 of D2≥0.3×L2, particularly D2≥0.5×L2, substantially perpendicular away from the first longitudinal axis 11.

Further, as exemplarily show in FIG. 1, the third HV connector 135 includes a third HV connection portion 135C. Typically, third HV connection portion 135C extends over a third distance D3 of D3≥0.3×L4, particularly D3≥0.5×L4, substantially perpendicular away from the second longitudinal axis 12. Typically, the fourth HV connector 136 includes a fourth HV connection portion 135C extending over a fourth distance D4 of D4≥0.3×L4, particularly D4≥0.5×L4, substantially perpendicular away from the second longitudinal axis 12.

According to some embodiments, which can be combined with other embodiments described herein, the first distance D1 can be substantially equal to the third distance D3. Further, the second distance D2 can be substantially equal to the fourth distance D4. According to an example, all of the first distance D1, the second distance D2, the third distance D3 and the fourth distance D4 are substantially equal. In the present disclosure, the expression "substantially equal" can be understood as being equal within a tolerance T of T≤10%, particularly T≤5%, more particularly T≤2%.

As exemplarily shown in FIG. 1, according to some embodiments, which can be combined with other embodiments described herein, the first LV winding 121 is provided with a first LV connector 123 and a second LV connector 124. Each of the first LV connector 123 and the second LV connector 124 extend substantially in a direction of the first longitudinal axis 11. Further, typically the second LV winding 122 is provided with a third LV connector 125 and a fourth LV connector 126. Each of the third LV connector 125 and the fourth LV connector 126 extend substantially in a direction of the second longitudinal axis 12. In the present disclosure, the expression "substantially in a direction" can be understood as being oriented in said direction within a deviation angle D from said direction of D≤±10°, particularly D≤±5°, more particularly D≤±2°.

In particular, the first LV connector 123 extends away from a first end 121A of the first LV winding 121 and the second LV connector 124 extends away from a second end 121B of the first LV winding 121, as exemplarily shown in FIG. 1. Further, typically the third LV connector 125 extends away from a first end 122A of the second LV winding 122 and the fourth LV connector 126 extends away from a second end 122B of the second. LV winding 122.

With exemplary reference to FIG. 1, according to some embodiments, which can be combined with other embodiments described herein, the first LV connector 123 of the first LV winding 121 is connected with the fourth LV connector 126 of the second LV winding 122 via a first electric line 141. Additionally, the second LV connector 124 of the first LV winding 121 is connected with the third LV connector 125 of the second LV winding 122 via a second electric line 142. Accordingly, the first LV winding 121 and the second LV winding 122 are connected in parallel.

Figure 2:
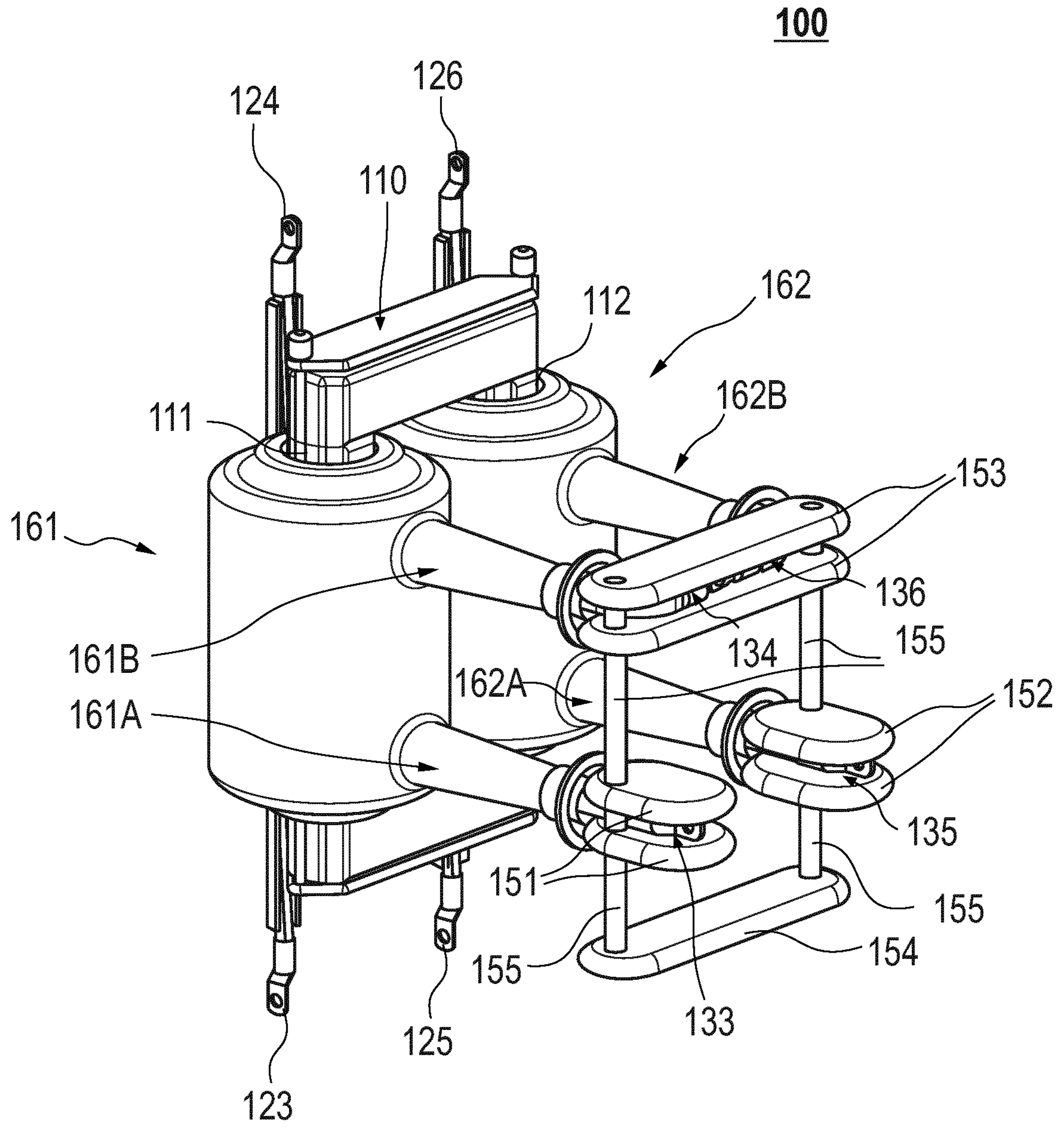
FIG. 2 shows a schematic view of a transformer including an insulation according to further embodiments described herein.

With exemplary reference to FIG. 2, according to some embodiments, which can be combined with other embodiments described herein, the transformer 100 includes a first casting 161 of an insulation material, particularly an insulating resin, provided around the first HV winding 131. Further, the first casting 161 is provided at least partially around the first HV connector 133 and the second HV connector 134. In particular, from FIG. 1 in combination with FIG. 2, it is to be understood that the first casting 161 may include a first extension 161A surrounding the first HV connection portion 133C and a second extension 161B surrounding the second HV connection portion 134C.

Additionally, as exemplarily shown in FIG. 2, typically the transformer 100 includes a second casting 162 of an insulation material, particularly an insulating resin, provided around the second HV winding 132 and at least partially around the third HV connector 135 and the fourth HV connector 136. In particular, from FIG. 1 in combination with FIG. 2, it is to be understood that the second casting 162 may include a third extension 162A surrounding the third HV connection portion 135C and a fourth extension 162B surrounding the fourth HV connection portion 136C.

With exemplary reference to FIG. 2, according to some embodiments, which can be combined with other embodiments described herein, the transformer 100 includes a first field grader 151 having two plate elements between which an end of the first HV connector 133 is arranged. Further, the transformer 100 includes second field grader 152 having two plate elements between which an end of the third HV connector 135 is arranged. Additionally, the transformer 100 includes a third field grader 153 having two plate elements between which an end of the second HV connector 134 and an end of the fourth HV connector 136 are arranged.

Further, as exemplarily shown in FIG. 2, the transformer can include a fourth field grader 154 having a plate element arranged below the first field grader 151 and the second field grader 152.

In particular, as exemplarily shown in FIG. 2, one or more supporting rods 155 can be provided between the first field grader 151 and the third field grader 153 and/or the fourth field grader 154. Additionally, one or more supporting rods 155 can be provided between the second field grader 152 and the third field grader 153 and/or the fourth field grader 154.

According to a particular example which can be combined with other embodiments described herein, the transformer 100 is a MFT designed for 240 kVA at 10 kHz with a high-voltage insulation (DC 50 kV, ACrms 69 kV, lightning impulse LI 150 kV). The height of the transformer core can be 50 cm, and the outer diameter of each of the first HV winding 131 and the second HV winding 132 can be 21 cm. One application for such a transformer specifications is, for example, grid connection of photo voltaic solar elements (utility-scale).

In view of the above, it is to be understood that compared to the state of the art, embodiments of the transformer of the present disclosure beneficially provide for a more compact, robust and cost efficient transformer. In particular, as exemplarily described with reference to FIG. 2, beneficially a transformer with an insulation system is provided including the bushings (i.e. connectors) of a single-phase core-type dry-type medium frequency transformer, where LV- and HV winding are each split into two windings, forming two coils each. Each coil has an inner LV-winding and an outer HV-winding, and is cast. The HV-winding has less height than the LV-winding to guarantee the required insulation distances to the core.

As exemplarily shown in FIG. 1, the sequence of windings inside the winding window $(LV-HV)_{COIL\_LEFT}-(HV-LV)_{COIL\_RIGHT}$ not only reduces the stray field in the winding window, but results in a significant reduction of the proximity effect and the related high-frequency winding losses, which typically dominate losses in an MFT.

The insulation between LV- and HV-winding of each coil is achieved by defining a minimum distance and casting with insulation material which withstands much higher electrical fields than e.g. air. Casting prevents partial discharge and gives high mechanical strength and robustness. With the proposed design, the outermost cast insulation layer thickness (HV to outer surface) can be much smaller than the required insulation between HV-winding and LV-winding and/or ground, which allows significantly improved convective air-cooling of the HV-winding.

Further, it is to be understood that according to embodiments which can be combined with other embodiments described herein, the low voltage windings as described herein and the respective high voltage windings as described herein are cast together, particularly without an air gap in-between. Accordingly, typically the low voltage windings as described herein and the respective high voltage windings as described herein are typically cast together inside the respective casting (i.e. inside the first casting 161 and/or the second casting 162) of insulation material as described herein. Accordingly, beneficially a very space saving transformer design can be provided.

As exemplarily described with reference to FIG. 1, to each of the two HV windings, two connectors (bushings) are placed in perpendicular direction of the core-winding's plane. Two of those connectors are electrically connected for series-connection of the two HV-windings. The two other connectors provide the HV connections of the MFT. The proposed arrangement guarantees maximum distance of the HV connectors (bushings) from LV windings and core, and the associated geometric edges. This allows a highly compact transformer design at low cost. The LV winding connectors are not critical concerning vicinity to the core, and can be parallel connected.

While the foregoing is directed to embodiments, other and further embodiments may be devised without departing from the basic scope, and the scope is determined by the claims that follow.

REFERENCE NUMBERS

100 transformer
110 transformer core
111 first core leg
11 first longitudinal axis
112 second core leg
12 second longitudinal axis
121 first low voltage winding
121A first end of first low voltage winding
121B second end of first low voltage winding
122 second low voltage winding
122A first end of second low voltage winding
122B second end of second low voltage winding
123 first LV connector
123C first LV connection portion
124 second LV connector
124C second LV connection portion
125 third LV connector
125C third LV connection portion
126 fourth LV connector
126C fourth LV connection portion
131 first HV winding
131A first end of first HV winding
131B second end of first HV winding
132 second HV winding
132A first end of second HV winding
132B second end of second HV winding
133 first HV connector
133C first HV connection portion
134 second HV connector
134C second HV connection portion
135 third HV connector
135C third HV connection portion
136 fourth HV connector
136C fourth HV connection portion
141 first electric line
142 second electric line
151 first field grader
152 second field grader
153 third field grader
154 fourth field grader
155 support rods
161 first casting
161A first extension
161B second extension
162 second casting
162A third extension
162B fourth extension
L1 first length
L2 second length
L3 third length
L4 fourth length
D1 first distance
D2 second distance
D3 third distance
D4 fourth distance

The invention claimed is:

1. A transformer, particularly a medium frequency transformer, comprising:

a transformer core having a first core leg having a first longitudinal axis and second core leg having a second longitudinal axis;

a first low voltage (LV) winding arranged around the first core leg, the first LV winding extending along a first length (L1) in the direction of the first longitudinal axis;

a first high voltage (HV) winding arranged around the first LV winding, the first HV winding extending along a second length (L2) in the direction of the first longitudinal axis, wherein the second length (L2) is shorter than the first length (L1);

a second low voltage (LV) winding arranged around the second core leg, the second LV winding extending along a third length (L3) in the direction of the second longitudinal axis;

a second high voltage (HV) winding arranged around the second LV winding, the second HV winding extending along a fourth length (L4) in the direction of the second longitudinal axis, wherein the fourth length (L4) is shorter than the third length (L3); and a first field grader having two plate elements between which an end of a first HV connector is arranged, a second field grader having two plate elements between which an end of a third HV connector is arranged, and a third field grader having two plate elements between which between an end of a second HV connector and an end of a fourth HV connector are arranged;

wherein the first HV winding is provided with the first HV connector and the second HV connector each extending substantially perpendicular away from the first longitudinal axis, and wherein the second HV winding is provided with the third HV connector and the fourth HV connector each extending substantially perpendicular away from the second longitudinal axis, wherein the second HV connector and the fourth HV connector are connected to each other and are arranged at the same end of the transformer.

2. The transformer of claim 1, wherein the second HV connector of the first HV winding is connected with the fourth HV connector of the second HV winding.

3. The transformer of claim 1, wherein the first HV connector of the first HV winding and the third HV connector of the second HV winding provide the HV connections of the transformer.

4. The transformer of claim 1, wherein the first HV connector is provided at a first end of the first HV winding and the second HV connector is provided at a second end of the first HV winding opposite the first end of the first HV winding, and wherein the third HV connector is provided at a first end of the second HV winding and the fourth HV connector is provided at a second end of the second HV winding opposite the first end of the second HV winding.

5. The transformer of claim 1, wherein the first HV connector comprises a first HV connection portion extending over a first distance D1 of $D1 \geq 0.3 \times L2$ substantially perpendicular away from the first longitudinal axis, wherein the second HV connector comprises a second HV connection portion extending over a second distance D2 of $D2 \geq 0.3 \times L2$ substantially perpendicular away from the first longitudinal axis, wherein the third HV connector comprises a third HV connection portion extending over a third distance D3 of $D3 \geq 0.3 \times L4$ substantially perpendicular away from the second longitudinal axis, and wherein the fourth HV connector comprises a fourth HV connection portion extending over a fourth distance D4 of $D4 \geq 0.3 \times L4$ substantially perpendicular away from the second longitudinal axis.

6. The transformer of claim 5, wherein the first distance D1 is substantially equal to the third distance D3, and wherein the second distance D2 is substantially equal, in particular equal, to the fourth distance D4, particularly wherein all of the first distance D1, the second distance D2, the third distance D3 and the fourth distance D4 are substantially equal, in particular equal.

7. The transformer of claim 1, wherein the first LV winding is provided with a first LV connector and a second LV connector each extending substantially in a direction of the first longitudinal axis, and wherein the second LV winding is provided with a third LV connector and a fourth LV connector each extending substantially in a direction of the second longitudinal axis.

8. The transformer of claim 7, wherein the first LV connector extends away from a first end of the first LV winding and the second LV connector extends away from a second end of the first LV winding, and wherein the third LV connector extends away from a first end of the second LV winding and the fourth LV connector extends away from a second end of the second LV winding.

9. The transformer of claim 7, wherein the first LV connector of the first LV winding is connected with the fourth LV connector of the second LV winding via a first electric line, and wherein the second LV connector of the first LV winding is connected with the third LV connector of the second LV winding via a second electric line.

10. The transformer of claim 1, further comprising a first casting of an insulation material provided around the first HV winding and around the first LV winding and at least partially around the first HV connector and the second HV connector, and a second casting of an insulation material provided around the second HV winding and at least partially around the third HV connector and the fourth HV connector.

11. The transformer of claim 4, wherein the first casting comprises a first extension surrounding the first HV connection portion and a second extension surrounding the second HV connection portion, and wherein the second casting comprises a third extension surrounding the third HV connection portion and a fourth extension surrounding the fourth HV connection portion.

12. The transformer of claim 1, further comprising a fourth field grader having a plate element arranged below the first field grader and the second field grader.

13. The transformer of claim 1, wherein one or more supporting rods are provided between the first field grader and the third field grader and/or the fourth field grader, and wherein one or more supporting rods are provided between the second field grader and the third field grader and/or the fourth field grader.

* * * * *